United States Patent [19]

Sato et al.

[11] Patent Number: 4,599,382
[45] Date of Patent: Jul. 8, 1986

[54] RUBBER COMPOSITION COMPRISING A THERMOSETTING RESIN AND A FUNCTIONAL RUBBER-LIKE COPOLYMER

[75] Inventors: Hozumi Sato; Shin-ichiro Iwanaga, both of Yokkaichi; Hiroji Enyo, Suzuka; Yasuhiko Takemura; Yoshiaki Kawamura, both of Yokkaichi, all of Japan

[73] Assignee: Japan Synthetic Rubber Co., Ltd., Tokyo, Japan

[21] Appl. No.: 714,032

[22] Filed: Mar. 20, 1985

[30] Foreign Application Priority Data

Mar. 21, 1984 [JP] Japan .................................. 59-52235
Mar. 21, 1984 [JP] Japan .................................. 59-52236

[51] Int. Cl.$^4$ ............................................ C08L 61/10
[52] U.S. Cl. .................................... 525/139; 525/142; 525/143; 525/161; 525/162; 525/163; 525/164
[58] Field of Search ............... 525/139, 142, 143, 161, 525/162, 163, 164

[56] References Cited

U.S. PATENT DOCUMENTS 4,435,543  3/1984  Ema et al. ........................... 525/143

*Primary Examiner*—Theodore E. Pertilla
*Attorney, Agent, or Firm*—Oblon, Fisher, Spivak, McClelland & Maier

[57] ABSTRACT

A rubber composition consisting essentially of 5-99 parts by weight of a thermosetting resin and 95-1 parts by weight of one of the following functional rubber-like copolymers (I) to (III) having a Mooney viscosity $ML_{1+4}^{100}$ of 20-120:

(I) a functional rubber-like copolymer consisting of 1-20% by weight of a monomer having epoxy groups, hydroxyl groups or amino groups, 15-50% by weight of acrylonitrile and 40-80% by weight of butadiene and/or isoprene as monomer units constituting the polymer, (II) a functional rubber-like copolymer consisting of 1-20% by weight of a monomer having epoxy groups, hydroxyl groups or amino groups, 40-99% by weight of an alkyl (meth)acrylate and/or an alkoxyalkyl (meth)acrylate and 0-30% by weight of monomers copolymerizable therewith other than butadiene and isoprene, as the monomer units constituting the polymer, and (III) a functional rubber-like copolymer consisting of 1-20% by weight of a monomer having epoxy groups, hydroxyl groups or amino groups, 15-50% by weight of acrylonitrile, 20-60% by weight of butadiene and/or isoprene and 5-65% by weight of an alkyl (meth)acrylate and/or an alkoxy (meth)acrylate as the monomer units constituting the polymer.

Said functional rubber copolymer may include 10% by weight or less of a polyfunctional monomer as a monomer unit constituting the polymer. In this case, the ratio of the thermosetting resin to the functional rubber-like copolymer is 50-99 parts by weight of the former to 1-50 parts by weight of the latter.

8 Claims, No Drawings

RUBBER COMPOSITION COMPRISING A THERMOSETTING RESIN AND A FUNCTIONAL RUBBER-LIKE COPOLYMER

This invention relates to a rubber-modified thermosetting resin composition excellent in impact resistance and having flexibility. More particularly, it relates to a rubber composition consisting of a thermosetting resin and a functional rubber-like copolymer.

Thermosetting resins such as phenol resins, melamine resins, urea resins and the like essentially have mechanical strength and are hard, while they are relatively brittle. It has been strongly desired in the field of the thermosetting resin industry to obtain molded products having a high impact strength compensating for the brittleness and a flexibility. That is to say, it is indispensable to impart a flexibility to resins in order to satisfy the demands of miniaturization and lightening.

On the other hand, rubbers are tough and have a high elasticity. It is one of the demands in the rubber industry to develop a material having a high mechanical strength, a high hardness and a short vulcanizing time in addition to the above-mentioned properties.

However, the compatibility between a natural rubber and a thermosetting resin is bad. Therefore, when any one of them is blended with the other even in a very small amount, the physical properties thereof are deteriorated.

This invention provides a rubber composition consisting of a thermosetting resin and a functional rubber-like copolymer and having an excellent mechanical strength, impact resistance and oil resistance without causing the deterioration of these physical properties.

Generally, it is possible to give a resin/rubber composition more resinous properties by increasing the proportion of a resin component, while it is also possible to give the composition more rubber-like properties by increasing the proportion of a rubber component. Furthermore, injection molding or extrusion molding is made possible by selecting an appropriate mixing ratio of a resin and a rubber, and an elastomer having thermoplasticity can be obtained by said selection.

For these purposes, a butadiene-acrylonitrile copolymer has heretofore been used as a rubber component in a rubber/resin composition known in the name of "rubber phenol".

However, a simple butadiene-acrylonitrile has merely an improved compatibility with a resin. Even when this is blended with a resin, the two are merely physically mixed and the mechanical strength is not sufficiently increased. Moreover, it has heretofore been known that a nitrile-butadiene rubber having carboxyl groups introduced thereinto is effective for the modification of a phenol resin; however, the nitrile-butadiene rubber has not yet reached the required level. On the other hand, when a specific functionality-imparted rubber-like copolymer according to this invention is used, not only is the compatibility with, for example, a phenol resin increased, but chemical bondings are also formed between the phenol resin and the rubber molecule, and an extremely characteristic composition is obtained.

According to this invention, there is provided a rubber composition consisting essentially of 5–99 parts by weight of a thermosetting resin and 95–1 parts by weight of one of the following functional rubber-like copolymers (I), (II) and (III) having a Mooney viscosity of $M_{1+4}^{100}$ of 20–120:

(I) a rubber-like copolymer consisting of 1–20% by weight of a monomer having epoxy groups, hydroxyl groups or amino groups, 15–50% by weight of acrylonitrile and 40–80% by weight of butadiene and/or isoprene as the monomer units constituting the polymer, wherein if the amount of acrylonitrile is less than 15% by weight, the oil resistance is insufficient, and if the amount exceeds 50% by weight, the elasticity is decreased, and hence, the amount is preferably 25–45% by weight. If the amount of butadiene and/or isoprene is less than 40% by weight, the copolymer is poor in rubber elasticity, and if the amount exceeds 80% by weight, the copolymer is inferior in the compatibility thereof with a thermosetting resin, (II) a rubber-like copolymer consisting of 1–20% by weight of a monomer having epoxy groups, hydroxyl groups or amino groups, 40–99% by weight of an alkyl (meth)acrylate and/or an alkoxyalkyl (meth)acrylate and 0–30% by weight of monomers copolymerizable with the above monomers other than butadiene and isoprene (specifically, ethylidenenorbornene, dicyclopentadienyl acrylate, acrylonitrile, styrene or the like may be added, if necessary) as the monomer units constituting the polymer, wherein if the amount of the alkyl (meth)acrylate and/or the alkoxy(meth)acrylate is less than 40% by weight, the compatibility with a thermosetting resin and the oil resistance are poor, (III) a rubber-like copolymer consisting of 1–20% by weight of a monomer having epoxy groups, hydroxyl groups or amino groups, 15–50% by weight of acrylonitrile, 20–60% by weight of butadiene and/or isoprene and 5–65% by weight of an alkyl(meth)acrylate and/or an alkoxyalkyl(meth)acrylate, wherein if the amount of acrylonitrile is less than 15% by weight, sufficient oil resistance cannot be obtained, and if the amount exceeds 50% by weight, the elasticity is lowered. Therefore, the amount is preferably 25–45% by weight. If the amount of the alkyl(meth)acrylate and/or the alkoxyalkyl(meth)acrylate is less than 5% by weight, the weatherability is inferior. If the amount exceeds 65%, the rubber property is inferior. Moreover, if the amount of butadiene and/or isoprene is less than 20% by weight, the rubber elasticity is inferior. If the amount exceeds 60% by weight, the weatherability is inferior.

Furthermore, this invention provides a rubber composition consisting essentially of 50–99 parts by weight of a thermosetting resin and 1–50 parts by weight of one of the following functional rubber-like copolymers (IV), (V) and (VI) having a Mooney viscosity $(ML_{1+4}^{100})$ of 20–120:

(IV) A functional rubber-like copolymer consisting of 1–20% by weight of carboxyl groups, epoxy groups, hydroxyl groups or amino groups, 15–50% by weight, preferably 25–45% by weight, of acrylonitrile, 40–80% by weight of butadiene and/or isoprene and 0–10% by weight of a polyfunctional monomer as the monomer units constituting the polymer, wherein the gel content described later is at least 20% by weight, preferably at least 50% by weight, (V) a functional rubber-like copolymer consisting of 1-20% by weight of a monomer having carboxyl groups, epoxy groups, hydroxyl groups or amino groups, 40-99% by weight of an alkyl(meth)acrylate and/or an alkoxyalkyl(meth)acrylate, 0-10% by weight of a polyfunctional monomer and 0-30% by weight of monomers copolymerizable with the above monomers other than butadiene and isoprene, as the monomer units constituting the polymer, wherein the gel content describe later is at least 20% by weight, preferably at least 50% by weight, and (VI) a functional rubber-like copolymer consisting of 1-20% by weight of a monomer having carboxyl groups, epoxy groups, hydroxyl groups or amino groups, 15-50% by weight, preferably 24-45% by weight, of acrylonitrile, 20-60% by weight of butadiene and/or isoprene, 5-65% by weight of an alkyl(meth)acrylate and 0-10% by weight of a polyfunctional monomer, wherein the gel content described later is at least 20% by weight, preferably at least 50% by weight.

By using a functional rubber-like copolymer containing a gel such as the functional rubber-like copolymers (IV), (V) or (VI), there is obtained a composition comprising 50% by weight or more of a thermosetting resin including a phenol resin and having an excellent mechanical strength and an excellent high impact strength which are the characteristic features of the present invention. Moreover, the above composition also has such characteristics that the modulus of elasticity is high and the shrinkage is small.

The term "gel content" used herein means the proportion of an insoluble matter obtained by precisely weighing about 1 g of the functional rubber-like copolymer, adding it to 100 ml of methyl ketone and allowing it to stand for 24 hours.

The monomer having carboxyl groups which is a component of the functional rubber-like copolymer includes specifically acrylic acid, methacrylic acid, maleic acid, fumaric acid and the like.

The monomer containing epoxy groups includes specifically glycidyl(meth)acrylate, allyl glycidyl ether, vinyl glycidyl ether and the like.

The monomer containing hydroxyl groups includes 1-hydroxypropyl(meth)acrylate, 2-hydroxypropyl(meth)acrylate, hydroxyethyl(meth)acrylate and the like.

The monomer containing amino groups includes specifically monomers containing tertiary amino groups such as dimethylamino(meth)acrylate, diethylaminoethyl(meth)acrylate, dibutylaminoethyl(meth)acrylate and the like.

The alkyl(meth)acrylate includes specifically ethyl acrylate, ethyl methacrylate, propyl acrylate, butyl acrylate, butyl methacrylate, hexyl acrylate, 2-ethylhexyl acrylate, octyl acrylate and the like. The alkoxyalkyl(meth)acrylate includes ethoxyethyl acrylate, methoxyethyl acrylate, propoxyethyl acrylate, methoxyethyl methacrylate, ethoxyethyl methacrylate, butoxyethyl acrylate, butoxyethyl methacrylate and the like.

An alkyl(meth)acrylate and an alkoxyalkyl(meth)acrylate having a functional group can be applied and specifically includes cyanoethyl(meth)acrylate, mercaptopropyl(meth)acrylate, vinyl(meth)acrylate and the like.

The polyfunctional monomer includes specifically divinylbenzene, ethylene glycol di(meth)acrylate and the like.

Polymerization of these monomers is carried out by a conventional emulsion polymerization, and it is carried out at 0°-50° C. in a reactor freed of oxygen.

Monomers, emulsifiers, initiators, molecular weight regulating agents and other polymerizing agents may be added at one time before the initiation of the reaction or portionwise suitably after the initiation of the reaction. Operation conditions such as temperature, agitation and the like can be suitably varied during the reaction. Polymerization may be carried out continuously or batchwise. The Mooney viscosity ($ML_{1+4}$, 100° C.) is in the range of 20-120. If it is less than 20, the elasticity-imparting effect is poor, and there is a possibility of causing problems such as pollution on molding or the like. If it exceeds 120, processing becomes difficult.

If the content of the functional group-containing monomer in the copolymer is less than 1% by weight, the reactivity with a thermosetting resin such as a phenol resin or the like is insufficient and the strength is lowered. If the content exceeds 20% by weight, the elastomeric properties become small and hence, it follows that the copolymer has neither elasticity nor impact resistance. The content is preferably 3-10% by weight.

The phenol resin used in this invention as one of the thermosetting resins may be either of a novolak type or of a resol type, and various modified phenol resins can be used according to the purposes.

The thermosetting resin/functional rubber-like copolymer weight ratio in the rubber composition of this invention is 99-5/1-95. In the rubber composition of this invention, when the proportion of the functional rubber-like copolymer is high, a composition showing a high elasticity which rubber has and having a high strength and an excellent oil resistance can be obtained. The thermosetting resin/functional rubber-like copolymer weight ratio is preferably 10-50/90-10.

On the contrary, when the ratio of the thermosetting resin blended is high, the composition shows the characteristic of high strength which the thermosetting resin has and, in addition, the impact resistance can be improved. Particularly, when the copolymer (IV), (V) or (VI) containing a gel is used, a composition having a higher elasticity and a small shrinkage on molding can be obtained. The thermosetting resin/functional rubber-like copolymer weight ratio is 50-99/1-50, preferably 70-97/3-30.

The rubber composition thus obtained has an improved mechanical strength, impact strength, oil resistance and the like as compared with those obtained by using conventional non-functional rubbers. Particularly, in the case of using the copolymers (I) and (IV), the rubber composition is suitable for uses demanding conventional oil resistance, in the case of using the copolymers (II) and (V) it is appropriate for uses demanding heat resistance and ozone resistance, and in the case of using the polymers (III) and (VI) it is suitable for uses demanding heat resistance in addition to oil resistance.

In the rubber/resin composition of this invention, an antioxidant, a stabilizer, a plasticizer, a softener, a filler, a reinforcing agent and a cross-linking agent may be blended, if necessary, and a compound is obtained by mixing them with the composition at 80°–200° C.

The mixing method is not critical, and a conventional roll, Banbury mixer, extruder or the like can be used depending on the mixing ratio of the rubber/resin.

This invention will be explained below referring to examples; however, it should be interpreted that this invention is not restricted thereto.

Part and % are by weight in the examples and comparative examples, unless otherwise specified.

EXAMPLES 1–21 AND COMPARATIVE EXAMPLES 1–12

Polymerization was carried out in an autoclave having an internal volume of 20 liters at 20° C. using the following monomers and polymerizing reagents:

|  | Part |
| --- | --- |
| Butadiene | 43 |
| Acrylonitrile | 47 |
| Diethylaminoethyl methacrylate | 10 |
| Water | 250 |
| Sodium dodecylbenzenesulfonate | 5 |
| Tertiary dodecylmercaptan | 0.45 |
| Potassium persulfate | 0.27 |
| Cyanoethylated diethanolamine | 0.15 |
| Potassium hydroxide | 0.1 |

After the polymerization conversion reached 70%, hydroxylamine sulfate was added to the reaction mixture in a proportion of 0.2 part per 100 parts of the monomers to terminate the polymerization. Subsequently, the mixture was heated, and the residual monomers were removed by steam distillation. Then, an alkylated phenol was added as an antioxidant in an amount of 1 part per 100 parts of the rubber solids, and the mixture was coagulated with an aqueous calcium chloride solution. The crumb obtained was washed with water and then dried under vacuum at 50° C. to prepare a sample for evaluation (Table 1, Sample 4).

Copolymers prepared in similar formulations are tabulated in Table 1.

In Table 1, it is noted that polymerization was terminated when the polymerization conversion reached 90% in the case of samples 12–17, namely the functional rubber-like copolymers containing a gel.

The phenol resin is of a resol type in Table 2, and of a novolak type in Tables 3–5. Moreover, the blending effects of melamine resin and urea resin are shown in Table 5.

Blending with the phenol resin was carried out at 120° C. on a roll, and a sufficient mixing was carried out. Subsequently, in the case where the proportion of the rubber-like copolymer of this invention in the rubber/resin composition is high, the composition was formed into a sheet having a thickness of 2 mm. A sample was obtained from the sheet by stamping out JIS-No. 1 dumbell and subjected to a tensile test using an autograph ($M_{100}$ refers to 100% modulus, $T_B$ to tensile strength, and $E_B$ to elongation).

The evaluation of oil resistance was carried out by dipping a sample obtained by damping out a plate of 20×20 cm in Fuel Oil C (toluene/isooctane=1/1 by volume) and determining the degree of swelling ($\Delta V$) from the volumes before and after dipping.

On the other hand, when the proportion of the rubber-like copolymer of this invention was low, in other words, the proportion of the phenol resin was high, the composition was formed into a sheet having a thickness of 4 mm, and a sample was cut off from the sheet by means of a milling mashine according to JIS-6911, and subjected to a flexural strength test and an Izod impact test.

The contents of the samples examined are shown in Table 1, and the results of the evaluation of the physical properties of the rubber/phenol resin compositions are shown in Tables 2, 3 and 4. The results of evaluation of the compositions having a higher proportion of the rubber-like copolymer of this invention are shown in Table 2, and the results of evaluation of the compositions having a higher proportion of a phenol resin are shown in Tables 3 and 4. In Table 3, the phenol resin used was of a novolak type, and the formulation thereof was as follows:

| Rubber-like copolymer of this invention (described in Table 1) | 1–50% |
| --- | --- |
| Phenol resin | 50–99 |
| Wood flour | 150 |
| Stearic acid | 2 |
| Hexamethylenetetramine | 10 |

As seen from Table 2 and Examples 1–3, when the rubber-like copolymer of this invention is used, a composition having an excellent mechanical strength and oil resistance is obtained. Furthermore, the effect thereof is apparent also in Examples 4–7. It is understood from the comparisons of Examples 8–10 with Comparative Examples 5 and 6 and of Examples 11–14 with Comparative Examples 7–9 in Table 3 that when the proportion of a phenol resin is high, the composition having excellent mechanical strength and impact resistance is obtained by using the rubber-like copolymer having introduced thereinto a functional group of this invention.

When a gel-containing functional rubber-like copolymer obtained by the copolymerization with a polyfunctional monomer is used, it is apparent that the composition having a good mechanical strength, good impact resistance, high modulus of elasticity and small shrinkage on molding is obtained. It is apparent from Table 5 that these effects are also obtained in the case of a melamine resin and a urea resin. That is, the objects can be accomplished by using a composition containing a functional rubber-like copolymer without polyfunctional monomers when a composition having low elasticity and excellent mechanical strength and impact resistance is demanded, and by using a composition containing a gel-containing functional rubber-like copolymer when a composition having a high elasticity is demanded.

TABLE 1

| | Sample 1 | Sample 2 | Sample 3 | Sample 4 | Sample 5 | Sample 6 | Sample 7 | Sample 8 | Sample 9 |
|---|---|---|---|---|---|---|---|---|---|
| Monomer charged (part) | | | | | | | | | |
| Butadiene | 43 | 30 | 43 | 43 | — | — | 30 | 25 | 53 |
| Acrylonitrile | 47 | 37 | 47 | 47 | 2 | 2 | 25 | 20 | 47 |
| Divinylbenzene | — | — | — | — | — | — | — | — | — |
| Butyl acrylate | — | — | — | — | 30 | 28 | 40 | 35 | — |
| Ethyl acrylate | — | — | — | — | 22 | 21 | — | — | — |
| Methoxyethyl acrylate | — | — | — | — | 40 | 36 | — | — | — |
| Ethylidene norbornene | — | — | — | — | 3 | 3 | — | — | — |
| Glycidyl methacrylate | 10 | 33 | — | — | 3 | — | — | — | — |
| 2-Hydroxypropyl methacrylate | — | — | 10 | — | — | — | 5 | — | — |
| Diethylaminoethyl methacrylate | — | — | — | 10 | — | 10 | — | 20 | — |
| Methacrylic acid | — | — | — | — | — | — | — | — | — |
| Charged tertiary dodecyl mercaptan | 0.50 | 0.60 | 0.45 | 0.45 | 0.03 | 0.04 | 0.18 | 0.25 | 0.45 |
| Amount of combined unit (%) | | | | | | | | | |
| Butadiene | 51 | 38 | 52 | 52 | — | — | 32 | 27 | 60 |
| Acrylonitrile | 40 | 37 | 40 | 39 | 2 | 2 | 25 | 21 | 40 |
| Divinylbenzene | — | — | — | — | — | — | — | — | — |
| Butyl acrylate | — | — | — | — | 32 | 30 | 38 | 35 | — |
| Ethyl acrylate | — | — | — | — | 24 | 22 | — | — | — |
| Methoxyethyl acrylate | — | — | — | — | 38 | 35 | — | — | — |
| Ethylidene norbornene | — | — | — | — | 2 | 2 | — | — | — |
| Glycidyl methacrylate | 9 | 25 | — | — | 2 | — | — | — | — |
| 2-Hydroxypropyl methacrylate | — | — | 8 | — | — | — | 5 | — | — |
| Diethylaminoethyl methacrylate | — | — | — | 9 | — | 9 | — | 17 | — |
| Methacrylic acid | — | — | — | — | — | — | — | — | — |
| Mooney viscosity, $ML_{1+4}$ (100° C.) | 56 | 49 | 45 | 49 | 52 | 40 | 52 | 66 | 56 |
| Gel content (%) | 0 | 0 | 0 | 0 | 4 | 3 | 0 | 0 | 0 |

| | Sample 10 | Sample 11 | Sample 12 | Sample 13 | Sample 14 | Sample 15 | Sample 16 | Sample 17 |
|---|---|---|---|---|---|---|---|---|
| Monomer charged (part) | | | | | | | | |
| Butadiene | — | 35 | 50 | 42 | 30 | — | 47 | 42 |
| Acrylonitrile | 2 | 25 | 48 | 46 | 25 | 2 | 37 | 45 |
| Divinylbenzene | — | — | 2 | 2 | 1.0 | 2 | 1 | 8 |
| Butyl acrylate | 31 | 40 | — | — | 34 | 27 | — | — |
| Ethyl acrylate | 23 | — | — | — | — | 20 | — | — |
| Methoxyethyl acrylate | 41 | — | — | — | — | 35 | — | — |
| Ethylidene norbornene | 3 | — | — | — | — | 3 | — | — |
| Glycidyl methacrylate | — | — | — | 10 | — | — | — | — |
| 2-Hydroxypropyl methacrylate | — | — | — | — | 10 | — | — | — |
| Diethylaminoethyl methacrylate | — | — | — | — | — | 10 | — | — |
| Methacrylic acid | — | — | — | — | — | — | 5 | 5 |
| Charged tertiary dodecyl mercaptan | 0.03 | 0.18 | 1.00 | 0.70 | 0.30 | 0.05 | 0.65 | 1.50 |
| Amount of combined unit (%) | | | | | | | | |
| Butadiene | — | 36 | 57 | 52 | 32 | — | 55 | 50 |
| Acrylonitrile | 2 | 25 | 41 | 39 | 26 | 2 | 39 | 39 |
| Divinylbenzene | — | — | 2 | 1 | 1 | 1 | 1 | 6 |
| Butyl acrylate | 33 | 39 | — | — | 34 | 31 | — | — |
| Ethyl acrylate | 25 | — | — | — | — | 21 | — | — |
| Methoxyethyl acrylate | 38 | — | — | — | — | 34 | — | — |
| Ethylidene norbornene | 2 | — | — | — | — | 2 | — | — |
| Glycidyl methacrylate | — | — | — | 8 | — | — | — | — |
| 2-Hydroxypropyl methacrylate | — | — | — | — | 8 | — | — | — |
| Diethylaminoethyl methacrylate | — | — | — | — | — | 9 | — | — |
| Methacrylic acid | — | — | — | — | — | — | 5 | 5 |
| Mooney viscosity, $ML_{1+4}$ (100° C.) | 38 | 55 | 62 | 44 | 59 | 38 | 60 | 48 |
| Gel content (%) | 6 | 0 | 82 | 84 | 71 | 77 | 68 | 93 |

TABLE 2

| | Example 1 | Example 2 | Example 3 | Comparative Example 1 | Comparative Example 2 | Example 4 |
|---|---|---|---|---|---|---|
| Functional rubber-like copolymer (A) of this invention | Sample 1 | Sample 3 | Sample 4 | Sample 2 | Sample 9 | Sample 5 |

A/Phenol resin = 70/30 (by weight)

TABLE 2-continued

| Normal physical properties | | | | | | |
|---|---|---|---|---|---|---|
| $M_{100}$ (kgf/cm$^2$) | 60 | 40 | 70 | — | 9.0 | 20 |
| $T_B$ (kgf/cm$^2$) | 430 | 380 | 470 | 200 | 102 | 280 |
| $E_B$ (%) | 580 | 600 | 590 | 80 | 750 | 950 |
| Oil resistance $\Delta V$ (%) Fuel-C 40° C. × 24 hr | 12 | 15 | 11 | 11 | 42 | 12 |
| A/Phenol resin = 90/10 (by weight) Normal physical properties | | | | | | |
| $M_{100}$ (kgf/cm$^2$) | 5.0 | 5.0 | 6.0 | 4.0 | 1.2 | 3.0 |
| $T_B$ (kgf/cm$^2$) | 65 | 60 | 60 | 40 | 60 | 60 |
| $E_B$ (%) | 1500 | 1600 | 2000 | 150 | 3000 or more | 2000 |
| Oil resistance $\Delta V$ (%) Fuel-C 40° C. × 24 hr | 29 | 32 | 29 | 30 | 60 | 30 |

| | Example 5 Sample 6 | Comparative Example 3 Sample 10 | Example 6 Sample 7 | Example 7 Sample 8 | Comparative Example 4 Sample 11 |
|---|---|---|---|---|---|
| Functional rubber-like copolymer (A) of this invention | | | | | |
| A/Phenol resin = 70/30 (by weight) Normal physical properties | | | | | |
| $M_{100}$ (kgf/cm$^2$) | 30 | 4.0 | 60 | 65 | 8.0 |
| $T_B$ (kgf/cm$^2$) | 350 | 80 | 400 | 450 | 98 |
| $E_B$ (%) | 900 | 1500 | 750 | 650 | 950 |
| Oil resistance $\Delta V$ (%) Fuel-C 40° C. × 24 hr | 13 | 41 | 12 | 14 | 35 |
| A/Phenol resin = 90/10 (by weight) Normal physical properties | | | | | |
| $M_{100}$ (kgf/cm$^2$) | 4.5 | 0.6 | 7.0 | 8.0 | 1.3 |
| $T_B$ (kgf/cm$^2$) | 90 | 5.0 | 80 | 95 | 6.0 |
| $E_B$ (%) | 1800 | 3000 or more | 1800 | 1700 | 3000 or more |
| Oil resistance $\Delta V$ (%) Fuel-C 40° C. × 24 hr | 26 | 62 | 29 | 25 | 50 |

TABLE 3

| Functional rubber-like copolymer of this invention (A) | Example 8 Sample 1 | Example 9 Sample 3 | Example 10 Sample 4 | Comparative Example 5 Sample 2 | Comparative Example 6 Sample 9 | Example 11 Sample 5 | Example 12 Sample 6 | Comparative Example 7 Sample 10 | Example 13 Sample 7 |
|---|---|---|---|---|---|---|---|---|---|
| A/Phenol resin = 5/95 (by weight) | | | | | | | | | |
| Flexural strength (kgf/cm$^2$) | 810 | 790 | 820 | 560 | 600 | 760 | 780 | 570 | 800 |
| Izod impact strength (kgf · cm/cm) | 3.8 | 4.3 | 4.1 | 2.4 | 2.6 | 4.1 | 4.3 | 2.2 | 4.0 |
| A/Phenol resin = 15/85 (by weight) | | | | | | | | | |
| Flexural strength (kgf/cm$^2$) | 780 | 750 | 770 | 520 | 590 | 690 | 710 | 490 | 740 |
| Flexural elasticity (kgf/cm$^2$) | 58000 | 52000 | 54000 | 62000 | 52000 | 46000 | 48000 | 49000 | 51000 |
| Izod impact strength (kgf · cm/cm) | 4.6 | 4.9 | 5.1 | 4.1 | 3.7 | 5.0 | 5.3 | 3.2 | 5.0 |
| Shrinkage on molding (cm/cm) | 0.016 | 0.018 | 0.016 | 0.014 | 0.019 | 0.020 | 0.018 | 0.019 | 0.017 |
| A/Phenol resin = 30/70 (by weight) | | | | | | | | | |
| Flexural strength (kgf/cm$^2$) | | | | | | | 370 | | |
| Flexural elasticity (kgf/cm$^2$) | | | | | | | 20000 | | |
| Izod impact strength (kgf · cm/cm) | | | | | | | 6.3 | | |
| Shrinkage on molding (cm/cm) | | | | | | | 0.025 | | |

| Functional rubber-like copolymer of this invention (A) | Example 14 Sample 8 | Comparative Example 8 Sample 11 | Comparative Example 9 Sample 12 | Example 15 Sample 13 | Example 16 Sample 14 | Example 17 Sample 15 | Example 18 Sample 16 | Example 19 Sample 17 |
|---|---|---|---|---|---|---|---|---|
| A/Phenol resin = 5/95 (by weight) | | | | | | | | |
| Flexural strength (kgf/cm$^2$) | 780 | 580 | | | | | | |
| Izod impact strength (kgf · cm/cm) | 4.1 | 2.1 | | | | | | |
| A/Phenol resin = 15/85 (by weight) | | | | | | | | |
| Flexural strength (kgf/cm$^2$) | 730 | 510 | 460 | 700 | 760 | 780 | 800 | 630 |
| Flexural elasticity (kgf/cm$^2$) | 54000 | 46000 | 69000 | 74000 | 72000 | 71000 | 76000 | 82000 |
| Izod impact strength (kgf · cm/cm) | 4.9 | 3.0 | 3.2 | 4.9 | 5.2 | 5.1 | 5.1 | 5.0 |
| Shrinkage on molding (cm/cm) | 0.015 | 0.019 | 0.014 | 0.010 | 0.012 | 0.014 | 0.010 | 0.009 |
| A/Phenol resin = 30/70 (by weight) | | | | | | | | |
| Flexural strength (kgf/cm$^2$) | | | | | | 370 | 490 | 330 |
| Flexural elasticity (kgf/cm$^2$) | | | | | | 38000 | 44000 | 46000 |
| Izod impact strength (kgf · cm/cm) | | | | | | 6.5 | 6.4 | 5.6 |
| Shrinkage on molding (cm/cm) | | | | | | 0.011 | 0.012 | 0.011 |

TABLE 4

| | Example 20 Sample 18 | Example 21 Sample 19 | Comparative Example 10 Sample 20 | Comparative Example 11 Sample 21 | Example 22 Sample 18 | Example 23 Sample 18 | Comparative Example 12 Sample 18 | Comparative Example 13 — |
|---|---|---|---|---|---|---|---|---|
| Rubber-like copolymer | | | | | | | | |
| Rubber-like copolymer content (part per 100 parts of phenol resin) | 10 | 10 | 10 | 10 | 2.5 | 17.5 | 30 | 0 |
| Flexural strength (kgf/cm$^2$) | 5.2 | 5.1 | 4.2 | 2.9 | 3.1 | 5.0 | 2.9 | 2.2 |
| Flexural elasticity (kgf/mm$^2$) | 460 | 440 | 410 | 320 | 510 | 390 | 300 | 540 |
| Izod impact strength (kgf · cm/cm) | 3.8 | 3.9 | 2.8 | 2.0 | 1.4 | 4.2 | 4.3 | 0.9 |

TABLE 5

| | Example 20 | Comparative Examle 10 | Comparative Example 11 | Example 21 | Comparative Example 12 |
|---|---|---|---|---|---|
| Formulation of rubber-like copolymer (A) (part) | | | | | |
| Butadiene | 52 | 52 | 60 | 32 | 32 |
| Acrylonitrile | 39 | 40 | 40 | 26 | 26 |
| Divinylbenzene | 1 | — | — | 0.7 | — |
| Glycidyl methacrylate | 8 | 8 | — | — | — |
| Butyl acrylate | — | — | — | 33.3 | 34 |
| 2-Hydroxypropyl methacrylate | — | — | — | 8 | 8 |
| Mooney viscosity of rubber-like copolymer (A), ML$_{1+4}$ (100° C.) | 44 | 50 | 56 | 59 | 52 |
| Gel content of rubber-like copolymer (A) | 84 | 0 | 0 | 71 | 0 |
| Thermosetting resin (B) | Melamine resin | Melamine resin | Melamine resin | Urea resin | Urea resin |
| Mixing ratio (A)/(B) | 10/90 | 10/90 | 10/90 | 10/90 | 10/90 |
| Properties of blending composition | | | | | |
| Flexural strength (kgf/cm$^2$) | 630 | 600 | 360 | 850 | 820 |
| Flexural elasticity (kgf/cm$^2$) | 80000 | 52000 | 58000 | 78000 | 44000 |
| Izod impact strength (kgf · cm/cm) | 6.1 | 6.1 | 3.5 | 5.9 | 5.7 |
| Shrinkage on molding (cm/cm) | 0.010 | 0.025 | 0.030 | 0.008 | 0.028 |

What is claimed is:

1. A rubber composition consisting essentially of 5–99 parts by weight of a thermosetting resin and 95–1 parts by weight of one of the following functional rubber-like copolymers (I), (II) and (III) having a Mooney viscosity ML$_{1+4}^{100}$ of 20–120:

(I) a functional rubber-like copolymer consisting of 1–20% by weight of a monomer having epoxy groups, hydroxyl groups or amino groups, 15–50% by weight of acrylonitrile and 40–80% by weight of butadiene, isoprene, or both of them, as the monomer units constituting the polymer or, (II) a functional rubber-like copolymer consisting of 1–20% by weight of a monomer having epoxy groups, hydroxyl groups or amino groups, 40–99% by weight of an alkyl(meth)acrylate, an alkoxyalkyl(meth)acrylate or both thereof and 0–30% by weight of monomers copolymerizable with said monomers other than butadiene and isoprene, as the monomer units constituting the polymer or (III) a functional rubber-like copolymer consisting of 1–20% by weight of a monomer having epoxy groups, hydroxyl groups or amino groups, 15–50% by weight of acrylonitrile, 20–60% by weight of butadiene, isoprene or both thereof and 5–65% by weight of an alkyl(meth)acrylate, an alkoxyalkyl(meth)acrylate, or both thereof, as the monomer units constituting the polymer.

2. A rubber composition consisting essentially of 50–99 parts by weight of a thermosetting resin and 1–50 parts by weight of one of the following functional rubber-like copolymers (IV), (V) and (VI) having a Mooney viscosity ML$_{1+4}^{100}$ of 20–120 and continng a gel in an amount of at least 20% by weight:

(IV) a functional rubber-like copolymer consisting of 1–20% by weight of a monomer having carboxyl groups, epoxy groups, hydroxyl groups or amino groups, 15–50% by weight of acrylonitrile, 40–80% by weight of butadiene, isoprene or both thereof and 0–10% by weight of a polyfunctional monomer, as the monomer units constituting the polymer, (V) a functional rubber-like copolymer consisting of 1–20% by weight of a monomer having carboxyl groups, epoxy groups, hydroxyl groups or amino groups, 40–99% by weight of an alkyl(meth)acrylate, an alkoxyalkyl(meth)acrylate or both thereof, 0–10% by weight of a polyfunctional monomer and 0–30% by weight of other monomers copolymerizable with said monomers than butadiene and isoprene, as the monomer units constituting the polymer, (VI) a functional rubber-like copolymer consisting of 1–20% by weight of a monomer having carboxyl groups, epoxy groups, hydroxyl groups or amino groups, 15–50% by weight of acrylonitrile, 20–60% by weight of butadiene, isoprene or both thereof, 5–65% by weight of an alkyl(meth)acrylate, an alkoxyalkyl(meth)acrylate or both thereof and 0–10% by weight of a polyfunctional monomer.

3. A rubber composition according to claim 2, wherein the functional rubber-like copolymers (IV), (V) and (VI) have a gel content of at least 50% by weight.

4. A rubber composition according to claim 1, wherein the thermosetting resin is a phenol resin.

5. A rubber composition according to claim 2, wherein the thermosetting resin is a phenol resin, a melamine resin or a urea resin.

6. A rubber composition according to claim 2, wherein the thermosetting resin is a phenol resin.

7. A rubber composition according to claim 3, wherein the thermosetting resin is a phenol resin, a melamine resin or a urea resin.

8. A rubber composition according to claim 3, wherein the thermosetting resin is a phenol resin.

* * * * *